HERBERT BINDER
WALTER J. KRUPICK
INVENTORS

April 15, 1969     H. BINDER ET AL     3,438,270
TWO-AXIS TORQUER

Filed Sept. 3, 1965

HERBERT BINDER
WALTER J. KRUPICK
INVENTORS

BY

*Thomas W. Kennedy*
ATTORNEY

United States Patent Office 3,438,270
Patented Apr. 15, 1969

3,438,270
TWO-AXIS TORQUER
Herbert Binder, New Monmouth, and Walter J. Krupick, Succasunna, N.J., assignors to Singer-General Precision, Inc., a corporation of Delaware
Filed Sept. 3, 1965, Ser. No. 484,825
Int. Cl. G01c *19/30, 19/28*
U.S. Cl. 74—5.47        14 Claims

ABSTRACT OF THE DISCLOSURE

Two-axis gyro having a permanent-magnet two-axis torquer in which the torquer is used both as a torquer magnet portion and as a rotor momentum rim and in addition the use of an electromagnet type of pickoff with the return path member used both as the pickoff return-path portion and as a part of the rotor momentum rim.

---

Figure 1:
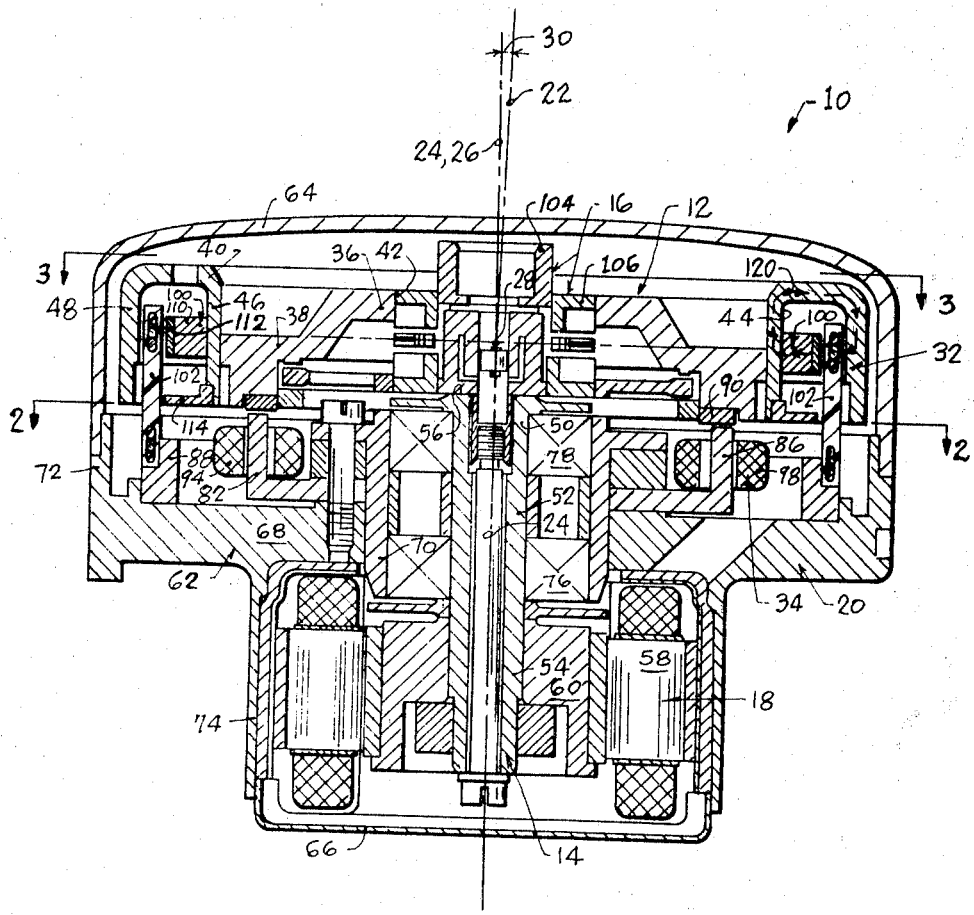

The present invention relates to a two-axis gyro, and particularly to a two-axis gyro having a permanent-magnet, two-axis torquer.

A conventional two-axis gyro having a torquer is described in U.S. Patent No. 3,077,785, that is assigned to the same assignee as in this invention. Said conventional gyro includes a rotor, a shaft, a support member in which said shaft is journaled for rotation of said shaft and said rotor relative to said support, a universal-joint connection between said rotor and said shaft for providing a tilt angle of said rotor relative to said shaft and said support member, and a pickoff means for sensing said tilt angle, in addition to said torquer means for providing the amount and direction of said tilt angle. Said conventional torquer is a nonmagnetic, electrostatic type of torquer.

One problem with said conventional nonmagnetic electrostatic torquer is that it has a high ratio of torquer size and weight relative to torquer output rating.

In accordance with one embodiment of the present invention, the ratio of torquer size and weight relative to torquer output rating can be minimized by using a permanent-magnet type of two-axis torquer. In addition, the ratio of gyro size and weight relative to torquer output rating can also be minimized by using said magnet of the torquer both as the torquer magnet portion and as the rotor momentum rim. Furthermore, another gyro parameter can be improved; that is, the ratio of gyro size and weight relative to pickoff output rating, which can also be minimized by using an electro-magnet type of pickoff and by using the return-path member of said pickoff both as the pickoff return-path portion and as part of the rotor momentum rim.

Accordingly, it is one object of the present invention to provide a two-axis gyro having a two-axis, permanent-magnet torquer, in which the ratios of torquer size and weight relative to torquer output rating, and of gyro size and weight relative to torquer output rating are minimized.

It is another object of the invention to provide a two-axis gyro having a two-axis, permanent-magnet torquer and also having a two-axis pickoff, in which the ratio of gyro size and weight relative to pickoff output rating is minimized.

To the fulfillment of these and other objects, the invention provides a two-axis gyro comprising a rotor, a shaft, a universal-joint connection between said rotor and said shaft, and a shaft support. Said rotor has a spin axis, and said shaft has a shaft axis, which intersects said spin axis forming a tilt angle therebetween. Said universal joint permits tilting of said rotor at an angle in any direction. Said shaft support is journaled over said shaft for rotation of said shaft relative thereto. Said rotor has a rim including an annular permanent-magnet, momentum-generating torquer portion, which forms one portion of a permanent-magnet D.C. torquer integral with said rim, and which minimizes the ratio of gyro weight relative to torquer output rating.

Figure 2:
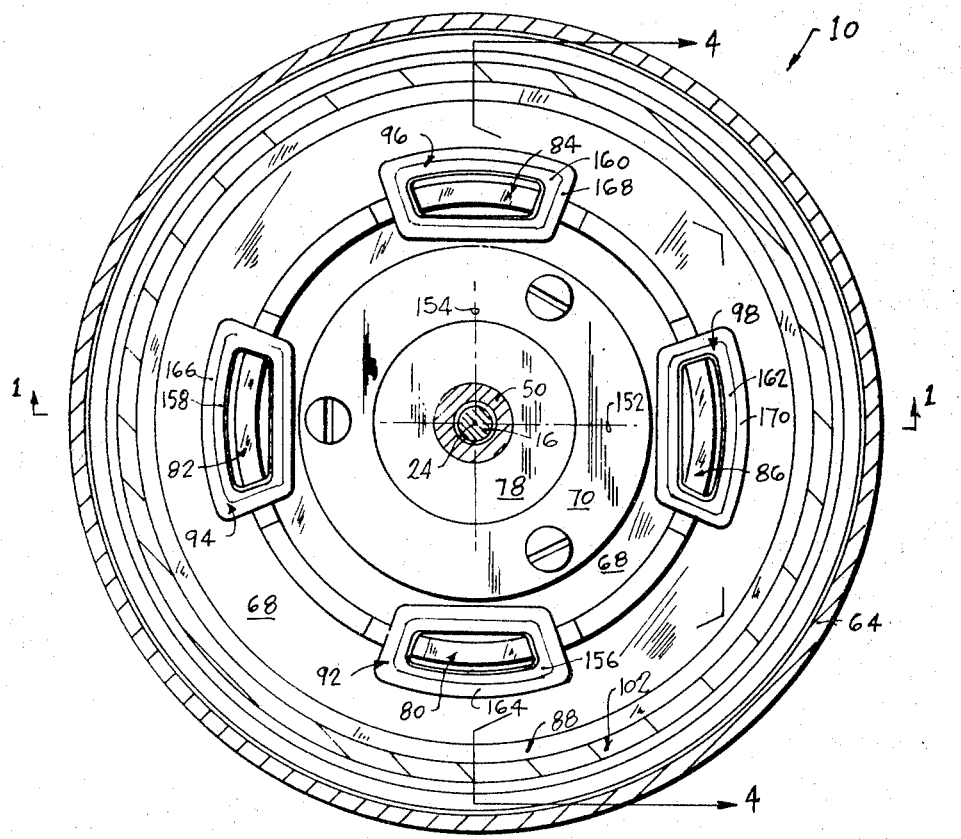
Figure 3:
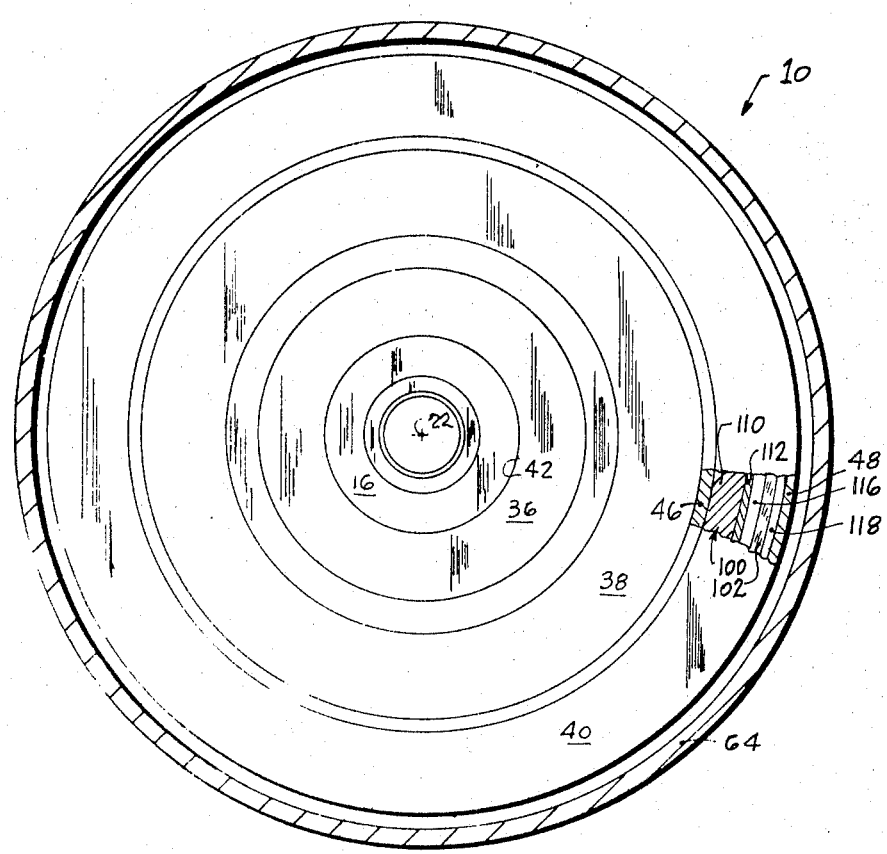
Figure 4:
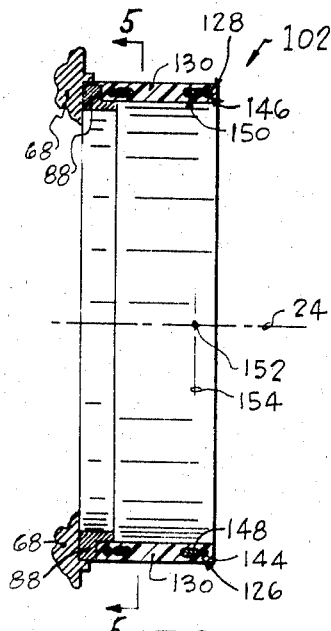
Figure 5:
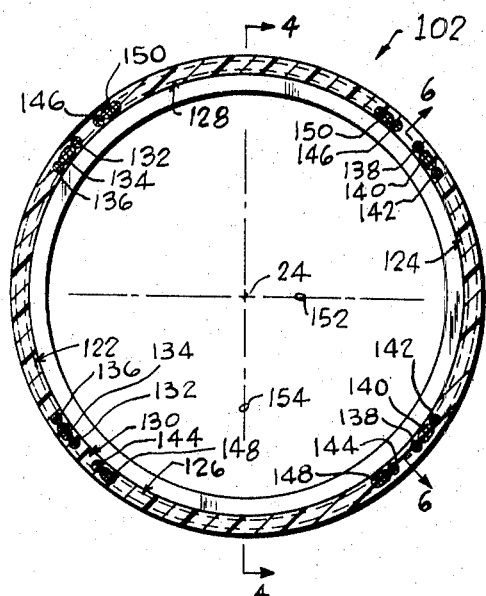
Figure 6:
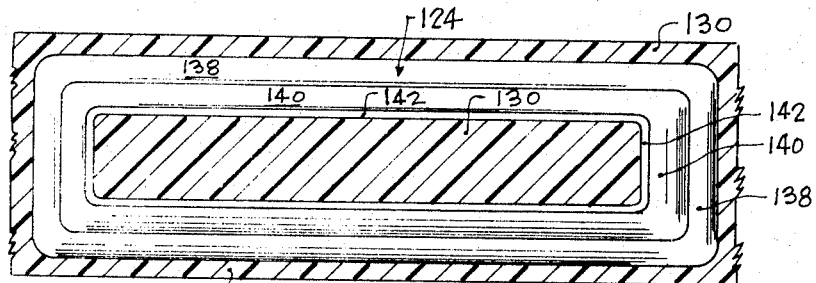
Figure 7:
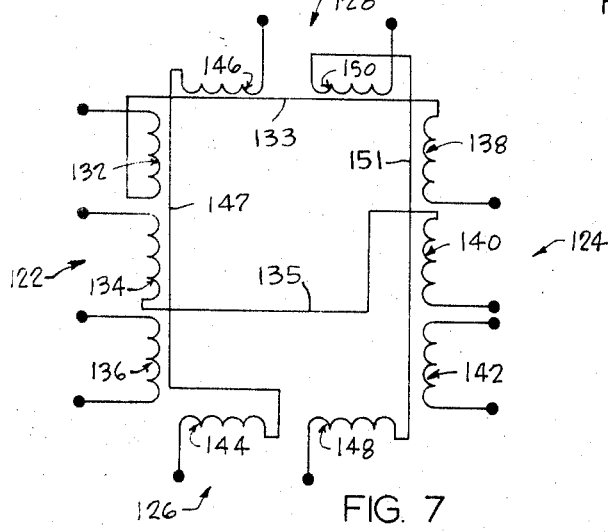

Other objects of the invention will become apparent upon reading the annexed detailed description in connection with the drawings, wherein like parts are designated by like numerals throughout the several views, and wherein:

FIG. 1 is a sectional view of a two-axis gyro embodying features of the present invention;
FIG. 2 is a sectional view taken along the line 2—2 of FIG. 1;
FIG. 3 is a sectional view taken along the line 3—3 of FIG. 1;
FIG. 4 is a sectional view taken along the line 4—4 of FIG. 2;
FIG. 5 is a sectional view taken along the line 5—5 of FIG. 4;
FIG. 6 is an enlarged sectional view taken along the line 6—6 of FIG. 5; and
FIG. 7 is a schematic diagram of a portion of FIG. 5.

Referring to the drawings, one embodiment of the present invention is a two-axis gyro 10. Gyro 10, which is a flexure-joint-suspended, free-rotor gyro, comprises a flywheel rotor 12, a shaft 14, and a one-piece frictionless gimbal-type hinge assembly 16, which interconnects shaft 14 to rotor 12 forming a universal-joint therebetween. Gyro 10 also has a drive means 18, which is operably connected to shaft 14 for rotating rotor 12 and shaft 14. In addition, gyro 10 has a support housing 20, which supports shaft 14, rotor 12 and drive 18.

Rotor 12 has a rotor spin axis 22. Shaft 14 also has a shaft axis 24. Hinge assembly 16, which is a universal-joint for tilting of rotor 12 in any direction, has a longitudinal gimbal axis 26. Axis 26 has a pivot point 28 thereon, which is the intersection of axis 22 with axis 24. Axis 22, axis 24 and axis 26 are also normally aligned when gyro 10 is at a null condition. In operation, axis 22 and axis 24 normally have an angle of tilt 30 therebetween.

Gyro 10 also has a torquer means 32 for varying tilt angle 30 in any direction; and has a pickoff means 34 for sensing a change in tilt angle 30 in any direction.

Rotor 12, which is in the shape of a wheel, has an annular hub portion 36, which is fixedly connected to hinge assembly 16, an annular web portion 38, which is fixedly connected to hub 36 extending radially outwardly therefrom, and an annular channel-shaped rim portion 40, which is fixedly connected to web 38 extending radially outwardly therefrom. Hub 36 has a circular radially inner surface 42, which is concentric about axis 22. Channel rim 40, which has a U-shape in cross-section and which is preferably a circular channel member, has an annular recess 44, which faces in an axially inward direction. Rim 40 has a radially inner flange 46 and a radially outer flange 48. Flanges 46, 48 are concentric about axis 22, point in a radially inward direction, and form the sidewalls of recess 44.

Shaft 14 has an upper end portion 50, which is fixedly connected to hinge assembly 16, a coaxial center portion 52, which is supported by housing 20, and a coaxial lower end portion 54, which is fixedly connected to drive 18. End 50 has an end face 56, which is connected to hinge assembly 16.

Drive 18, which is preferably a conventional electric motor, has an outer wound stator 58, which is fixedly connected to housing 20, and has an inner armature 60, which is fixedly connected to shaft end 54 and which is rotatable relative to stator 58.

Housing 20, which is coaxial with shaft 14 along axis 24, has an annular frame member 62 for connection to a vehicle (not shown), an upper cap member 64 for enclosing rotor 12, and a lower cap member 66 for enclosing drive 18.

Frame 62 includes an annular, flat plate 68, which is coaxial with shaft 14 and drive 18, for connection to said vehicle (not shown) for support of gyro 10 therefrom. Plate 68 has an integral, coaxial, center sleeve 70, which forms a bearing for shaft 14. Plate 68 also has an integral, cylindrical, upper flange 72, which extends in an axially upward direction from plate 68 and which connects to cap 64 at the upper end thereof for support of cap 64 therefrom. Plate 68 also has an integral, cylindrical, lower flange 74, which extends in an axially downward direction from plate 68 and which connects to cap 66 at the lower end thereof for support of said cap 66 threrfrom. Flange 74, which is disposed radially outwardly of drive 18, connects to stator 58 for support of drive 18 by frame 62. Sleeve 70 supports a pair of axially spaced ball-bearing units 76, 78. Bearing units 76, 78, which are mounted on the radially innerside of sleeve 70, are press-fitted over shaft center portion 52.

Plate 68 has four pickoff support bars 80, 82, 84, 86, which extend in an axially upward direction therefrom for support of pickoff means 34 and which are equiangularly spaced about shaft axis 24 at equal radial distances therefrom. Plate 68 also has an integral torquer support ring 88, which extends in an axially upward direction therefrom for support of torquer means 32. Plate 68, sleeve 70, flange 72, flange 74, ball-bearing units 76, 78, and torquer support ring 88 are all concentric about shaft axis 24.

Pickoff 34 includes an annular magnet ring 90, which is fixedly connected to web 38, and also includes four small coils 92, 94, 96, 98, which are equiangularly spaced about shaft axis 24 and which are respectively wound on bars 80, 82, 84, 86.

Torquer 32, which is a two-axis type of torquer, includes a magnet means 100, which is fixedly connected to rim 40, and includes a coil means 102, which is fixedly connected to support ring 88.

Hinge assembly 16 includes a one-piece, three-gimbal, four-bar, inner hinge unit 104, and includes a one-piece, three-gimbal, four-bar, outer hinge unit 106. Using hinge assembly 16, its static spring rate can be counterbalanced by its dynamic spring rate thereby providing a zero spring rate by calibrating hinge assembly 16 for the fixed rotor speed at the gyro operating condition.

Torquer magnet means 100 has a magnet ring 110, which is fixedly connected to inner flange 46, and has a support retainer 112, which has a shrink-fit engagement over magnet ring 110 whereby magnet ring 110 is fixedly clamped to flange 46. Magnet 110 is radially magnetized so that its outer diameter is at one polarity and so that its inner diameter is at an opposite polarity. Flange 46 has an annular magnet shield 114 of L-shaped cross-section, which overhangs a portion of groove 44 and overlaps magnet 110.

Torquer coil 102 and retainer 112 are separated by an annular radially inner clearance or air gap 116. Coil assembly 102 and outer flange 48 are similarly separated by an annualar radially outer clearance or air gap 118. With this construction, rim 40 acts as a return path and conducts magnetic flux lines 120 therethrough. Flux 120 starts at magnet 110 and passes in series through flange 46, flange 48, air gap 118, coil assembly 102, air gap 116, retainer 112 and then back to magnet 110. With this arrangement, shield 114 minimizes any disturbance of flux 120 caused by pickoffs 92, 94, 96, 98 or caused by drive 18, As best seen in FIGURE 5, torquer coil assembly 102, which is a ring of thinwall construction, includes four coil units 122, 124, 126, 128, which are disposed in equispaced quadrants about shaft axis 24 for conducting direct current therethrough. Coil units 122, 124 are arranged diametrically opposite to each other, and coil units 126, 128 are similarly arranged diametrically opposite to each other.

Torquer coil assembly 102 also includes a castable insulation 130, which is a substantially rigid high-strength material such as a nonmagnetic potting compound. Castable insulation 130 is supported by ring 88 and in turn supports coil units 122, 124, 126, 128.

Coil unit 122, which has an arcuate shape and a thin-wall construction (FIG. 4), has a main coil 132, a bias coil 134 and a trim coil 136. Coil 132 is wound over coil 134, which is in turn wound over coil 136. Coils 132, 134, 136 are made of rectangular-shaped wire turns (FIG. 6).

As best shown in FIGURE 7, coil unit 124, which is substantially identical in construction to coil 122, also has a main coil 138, which is connected in series to coil 132 by line conductor 133, a bias coil 140, which is connected in series to coil 134 by line conductor 135, and a trim coil 142, which is separate from coil 136.

Coil units 126, 128, which are substantially identical to each other, and which are identical in shape to units 122, 124, respectively have main coils 144, 146, which are connected to each other in series by line conductor 147, and bias coils 148, 150, which are also connected to each other in series by line conductor 151. Units 122, 124 and 126, 128 have respective torquing axes 152 and 154. Units 122, 124, cause rotation about axis 154, and units 126, 128 cause rotation about axis 152. Bias coils 134, 140, 148, 150 are used to calibrate torquer coil 102. Trim coils 136, 142 are used to trim the orthogonality of the torquing axes 152, 154.

Coil units 122, 124, 126, 128 are calibrated to operate most efficiently, and hinge assembly 16 is simultaneously calibrated to have a zero-spring rate for the gyro operating condition at which rotor 12 has a fixed operating speed. In this way, unbalancing torques from hinge 16 are substantially eliminated whereby error in torquer 32 is substantially minimized.

Pickoff coils units 92, 94, 96, 98 (FIG. 2), which are respectively equispaced from axes 152, 154, have respective primary pickoff coils 156, 158, 160, 162, which are respectively wound over bars 80, 82, 84, 86. Coil units 92, 94, 96, 98 also have respective secondary pickoff coils 164, 166, 168, 170, which are respectively wound over coils 156, 158, 160, 162. Ring 90 is composed of a highly permeable material for providing a magnetic return path with portions adjacent to pickoff coil units 92, 94, 96, 98.

With this construction, torquer return-path rim 40, torquer magnet 110, and pickoff return-path ring 90 provides substantially all of the rotor momentum. With such arrangement, rim 40, magnet 110 and ring 90 provide the dual functions of momentum generation and of gyro torquing.

In summary, the invention provides a two-axis gyro 10 having a two-axis, permanent-magnet torquer 32, in which the ratios of torquer size and weight relative to torquer output rating and of gyro size and weight relative to torquer output rating are minimized. In addition, this invention provides a two-axis gyro 10 having a two-axis, permanent-magnet torquer 32 and having a two-axis pickoff 34, in which the ratio of gyro size and weight relative to pickoff output rating is minimized.

While the present invention has been described in a preferred embodiment, it will be obvious to those skilled in the art that various modifications can me made therein within the scope of the invention. It is intended that the appended claims cover all such modifications.

What is claimed is:

1. A two-axis gyro comprising:
   a rotor with a spin axis;
   a shaft with a shaft axis intersecting said spin axis and forming a tilt angle therebetween;
   a universal-joint connection between said rotor and said shaft for tilting of said rotor in any direction relative to said shaft;

a shaft support in which said shaft is mounted for rotation relative thereto; and said rotor having a rim including an annular permanent-magnet, momentum-generating torque portion for minimizing the ratio of the gyro weight relative to the torque output rating.

2. A gyro as claimed in claim 1, in which said shaft support has an annular torque coil assembly disposed adjacent said permanent-magnet rim portion with four arcuate-shaped, thin-walled coil units equiangularly spaced about said shaft axis for furnishing the coil portion of the permanent-magnet torquer.

3. A gyro as claimed in claim 2, in which said four coil units have respective main coils of rectangular-shaped wire turns with diameterically opposite main coils being connected in series.

4. A gyro as claimed in claim 3, in which said four coil units also have respective bias coils of rectangular-shaped wire turns with diametrically opposite bias coils being connected in series.

5. A gyro as claimed in claim 3, in which said four coil units include two opposite coil units having respective independent trim coils of rectangular-shaped wire turns.

6. A gyro as claimed in claim 2, in which said torquer coil assembly is a cylindrical ring of thin-wall construction having a substantially rigid insulation portion disposed between and around said coil units for supporting said coil units.

7. A gyro as claimed in claim 2, in which said rim has an annular return path, channel shaped portion composed of a highly permeable material and fixedly connecting to said shaft and having a groove facing axially inwardly with a groove sidewall being fixedly connected to said magnet portion for supporting said magnet portion and for forming a return path for said magnet; and in which said torquer coil assembly has a portion received with clearance in said groove and disposed adjacent to said magnet.

8. A gyro as claimed in claim 7, in which said magnet portion is a separate ring member having a separate retainer ring disposed on the radially outerside thereof and being shrink-fitted over said magnet ring for clamping said magnet ring to said groove sidewall.

9. A gyro as claimed in claim 7, in which said groove sidewall has a magnet shield portion overhanging said magnet portion for minimizing disturbance of said torquer magnet flux field.

10. A gyro as claimed in claim 2, in which said rim has another annular return-path portion composed of a highly permeable material and being arranged concentric about said spin axis for forming a pickoff return path and for minimizing the ratio of the gyro weight relative to the pickoff output rating.

11. A gyro as claimed in claim 10, in which said shaft support has four pickoff coil units respectively disposed adjacent said pickoff return path member with clearance therefrom and equiangularly spaced about said shaft axis with each coil unit including a primary coil portion and a secondary coil portion.

12. A gyro as claimed in claim 2, in which said universal-joint connection is a one-piece, gimbal-type, zero-spring-rate flexure unit for avoiding unbalancing of said torquer.

13. A permanent-magnet direct current two-axis torquer comprising:

a rotor including a single permanent-magnet ring with a spin axis; and a stator for supporting said rotor for rotation relative thereto including a coil assembly with a coil axis intersecting said spin axis at a slight tilt angle relative thereto and having four equispaced coil units disposed adjacent to said magnet ring with respective main coil portions for measuring the direction and amount of said tilt angle and with respective bias coil portions and also trim coil portions for calibrating said torquer.

14. A gyro comprising:

a rotor, a shaft, a one-piece, gimbal-type hinge assembly interconnecting said shaft and said rotor, a drive means connecting to said shaft, a support housing supporting said shaft, said rotor and said drive, a torquer means for varying the tilt of said rotor, a pickoff means for sensing said tilt, said rotor having a rim portion, a web portion and a hub portion, said shaft having an upper end portion connecting to said hinge assembly and a center portion supported by said housing and a lower end portion connecting to said drive, said drive having an outer wound stator connecting to said housing and having an inner armature connecting to said shaft lower end, said housing having an annular frame for connection to a vehicle and an upper cap member for enclosing said rotor and a lower cap member for enclosing said drive, said frame having an annular plate with a center bearing sleeve journaled on said shaft and having an upper flange connecting to said upper cap and having a lower flange connecting to said lower cap, said frame sleeve having a pair of ball-bearing units press-fitted over said shaft center portion.

said plate having four pickoff support bars for support of said pickoff means and having a torquer support ring for support of said torquer means, said pickoff means having an annular return path ring connecting to said rotor web and having four coils wound on said pickoff support bars, said torquer means having a magnet connecting to said rotor rim and having a coil connecting to said torquer support ring, said rim has an annular recess facing axially inwardly, said recess having a radially inner sidewall and having a radially outer sidewall, said inner sidewall being fixedly connected to said magnet and having a shield portion overhanging said magnet, said torquer coil and said magnet being separated by an annular radially inner air gap and said torquer coil and said outer sidewall being separated by an annular radially outer air gap whereby said rim acts as a torquer magnet return path, said torquer coil including four coil units being disposed in equiangular spacing about shaft axis and including a castable insulation portion enclosing said coil units for support therefrom, each coil unit having a main coil portion and having a bias coil portion, and said pickoff coils each having a primary pickoff coil portion and a secondary coil portion.

References Cited

UNITED STATES PATENTS 3,107,540 10/1963 Curriston _____ 74—5.46
3,279,086 10/1966 Schlitt et al. _____ 74—5.47

C. J. HUSAR, *Primary Examiner.*